United States Patent [19]

Suzuki et al.

[11] 4,338,666

[45] Jul. 6, 1982

[54] SPEED CHANGE CONTROL DEVICE FOR AUTOMATIC TRANSMISSION

[75] Inventors: Tadashi Suzuki; Norimasa Kishi, both of Yokosuka, Japan

[73] Assignee: Nissan Motor Co., Ltd., Japan

[21] Appl. No.: 165,705

[22] Filed: Jul. 3, 1980

[30] Foreign Application Priority Data

Jul. 9, 1979 [JP] Japan .................................. 54-86614

[51] Int. Cl.$^3$ .............................................. B60K 41/04
[52] U.S. Cl. .................................. 364/424.1; 74/844;
  74/856; 74/866; 364/426
[58] Field of Search ............... 364/424, 426, 431, 565;
  192/3.51, 4 R, 4 A; 74/844, 854–856, 862, 865,
  866, 877

[56] References Cited

U.S. PATENT DOCUMENTS

| | | | |
|---|---|---|---|
| 3,938,409 | 2/1976 | Uozumi | 74/856 |
| 4,039,061 | 8/1977 | Pruvot et al. | 364/426 |
| 4,073,203 | 2/1978 | Wurst et al. | 74/866 |
| 4,102,222 | 7/1978 | Miller et al. | 74/866 |
| 4,107,776 | 8/1978 | Beale | 74/866 |
| 4,198,882 | 4/1980 | Kiencke et al. | 74/866 |
| 4,208,929 | 6/1980 | Heino et al. | 74/866 |
| 4,233,862 | 11/1980 | Richard | 74/866 |

FOREIGN PATENT DOCUMENTS

| | | |
|---|---|---|
| 1337713 | 11/1973 | United Kingdom . |
| 1344971 | 1/1974 | United Kingdom . |
| 1377437 | 12/1974 | United Kingdom . |
| 2034422 | 6/1980 | United Kingdom . |

*Primary Examiner*—Errol A. Krass
*Attorney, Agent, or Firm*—Lane, Aitken, Kice & Kananen

[57] ABSTRACT

A shift control device for an automatic transmission is disclosed. The device comprises a vehicle speed sensor for sensing vehicle speed, an engine load sensor for sensing engine load, a shift control circuit for generating shift instruction signal based on a predetermined shift pattern in accordance with output signals from both sensors, a shift pattern decision circuit including means for generating a resulting signal obtained by arithmetically operating upon the actually measured acceleration from the output voltage of the vehicle speed sensor, a reference acceleration setting means connected to both sensors for obtaining for every shift position a reference acceleration corresponding to the output signals delivered from the vehicle speed sensor and engine load sensor, a comparator means for comparing the actually measured acceleration with the reference acceleration to change a predetermined shift pattern based on the compared result, and means for setting a hysteresis characteristic to the change of the shift pattern.

8 Claims, 11 Drawing Figures

| (Address of ROM) | (a,b) | Expected Acceleration | (Section Shown in FIG.7A) |
|---|---|---|---|
| Tagl+0 = 000 | (0,0) | $\alpha rH$ | } 1 |
| Tagl+1 = 001 | (0,0) | $\alpha rL$ | |
| Tagl+2 = 002 | (1,0) | $\alpha rH$ | } 2 |
| | (1,0) | $\alpha rL$ | |
| | ⋮ | | |
| | (7,0) | $\alpha rH$ | } 8 |
| | (7,0) | $\alpha rL$ | |
| | (0,1) | $\alpha rH$ | } 9 |
| | (0,1) | $\alpha rL$ | |
| | (1,1) | $\alpha rH$ | } 10 |
| | (1,1) | $\alpha rL$ | |
| | ⋮ | | |
| Tagl+70 = 070 | (3,4) | $\alpha rH$ | } 36 |
| Tagl+71 = 071 | (3,4) | $\alpha rL$ | |
| | ⋮ | | |
| Tagl+126 = 126 | (7,7) | $\alpha rH$ | } 64 |
| Tagl+127 = 127 | (7,7) | $\alpha rL$ | |

FIG.8

SPEED CHANGE CONTROL DEVICE FOR AUTOMATIC TRANSMISSION

BACKGROUND OF THE INVENTION

The present invention relates to a shift control device for an automatic transmission of the electronic control type, and more particularly, to a shift control device incorporating an automatic shift pattern changeover means therein.

The shift pattern of an automatic transmission for an automotive vehicle or the like is primarily determined to be the most suitable pattern by every vehicle by assuming a certain running condition (typically surface gradient or grade of road surface). The running condition of vehicle, however, is successively changed and particularly this change is most considerable on mountainous roads so that the above shift pattern is not always the most suitable or comfortable.

This shift pattern determines a shift-up line so as to select the highest speed capable of accelerating the vehicle, and determines a shiftdown line by shifting it slightly to the low speed side than of the shift-up line, based on a relationship between the driving torque of vehicle caused by transmitting an engine output torque changed in accordance with engine load (for example, the degree of throttle opening) to a driving wheel through a reduction gear, and a running resistance under the certain running conditions.

Figure 1:
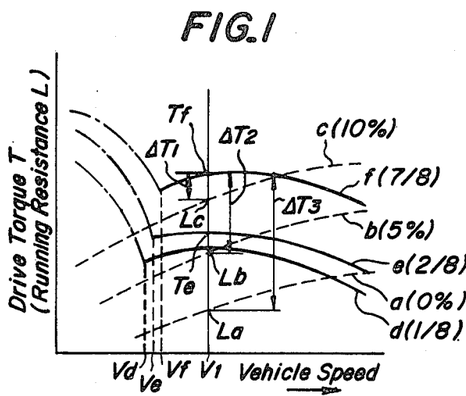
FIG. 1 is a diagrammatic view showing a relation between the vehicle speed, the driving torque and the running resistance for automobile.

The acceleration of a vehicle obtained from a relation between the driving torque and the running resistance of a vehicle, here, is considered. The running resistance is changed as shown in FIG. 1 by a, b and c when, for example, the grade of road surface is 0%, 5% and 10%, respectively. Each running resistance a, b, c becomes large as a vehicle speed becomes high since air resistance increases and the difference between running resistances a, b and c is the difference in the running resistance caused by the difference in the grade of the road surface. The driving torque differs by the load condition of engine, for example, the degree of throttle opening and the reduction gear ratio (speed change or shift position). For example, when the throttle opening degree is 1/8, 2/8 and 7/8 in the case of vehicle having two speed shifts the driving torque is changed as, for example, shown in FIG. 1 by curves d, e and f, respectively. In FIG. 1 the lower speed side (left side in the drawing) the vehicle speeds $V_d$, $V_e$, $V_f$ of each driving torque line d, e, f shows the case of selecting the low speed shift, while the high speed side (right side in the drawing) shows the case of selecting the high speed shift.

In FIG. 1, let the vehicle speed V be $V_1$, a running resistance L is $L_a$, $L_b$ and $L_c$ when the grade of road surface is 0%, 5% and 10%, respectively, and a driving torque T becomes $T_f$ when running at a high speed shift with the throttle opening of 7/8. Therefore, during these running conditions, if the grade of road surface is 10%, 5% and 0%, respectively, torque allowance $\Delta T$ becomes as shown by $\Delta T_1$, $\Delta T_2$ and $\Delta T_3$, respectively, and further becomes smaller as the grade of road surface becomes sharp. An acceleration $\alpha$ given to a vehicle becomes large in proportion to the torque allowance, and is expressed by $\alpha = (\Delta T/K)$ (K is a constant corresponding to inertial mass of the vehicle). The driving torque T varies according to the throttle opening, so that if the throttle opening is changed from 7/8 to 2/8, the torque is lowered from $T_f$ to $T_e$. In this case, if a vehicle is running on the road having the road surface gradient of 10%, the driving torque $T_e$ is smaller than the running resistance $L_c$, so that the vehicle cannot be accelerated.

Figure 2A:
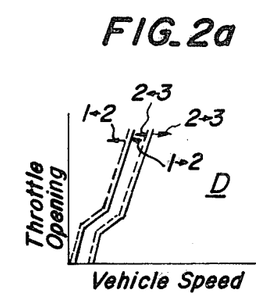
FIGS. 2a, 2b and 2c are diagrams showing shift change patterns D, $S_1$ and $S_2$ which are selected and used in a shift control device of electronic controlled automatic transmission according to the present invention.
Figure 2B:
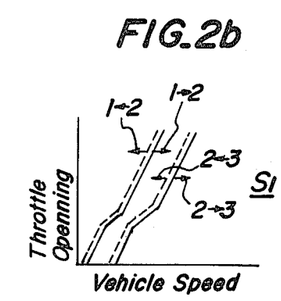
Figure 2C:
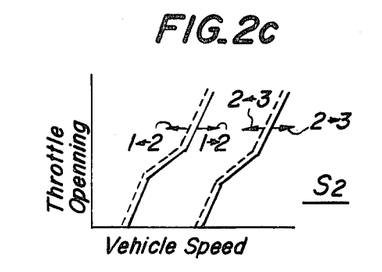

With the aid of the above relation, from driving torque curves (d–f) and running resistance curves (a–c) determined for every vehicle, the present throttle opening, vehicle speed and shift position are taken into consideration, so that a reference acceleration obtained during this running can be obtained, the thus obtained reference acceleration is compared with the actual vehicle acceleration so as to judge the road gradient, shift patterns D, $S_1$ and $S_2$, where the sharper the road surface gradient as shown in FIGS. 2a, 2b and 2c, the higher the shift line, are selected, and whatever the road surface gradient is, smooth and efficient acceleration can be carried out, thereby solving a problem inherent to the shift control device having a single shift pattern. Such device has been proposed.

However, when the vehicle is running on the road surface in which gradient is often changed, with the use of the above automatic transmission, a shift pattern is often changed by every gradient change in a short time, unnecessary up-shift and down-shift are frequently carried out, so that riders receive shocks every time and feel uncomfortable.

Therefore, there has been such ideas that (1) in case only when a certain time is required from a decision for changing a shift pattern to the next decision for change, the shift pattern is actually altered to the corresponding one, and (2) a decision for changing a shift pattern is made by every certain time and in case only when an instruction is given for selecting another speed change pattern, the shift pattern is altered.

Even if either one of the above ideas (1) and (2) is employed, if the certain time is prolonged, the change of shift pattern in response to the change of the road surface gradient is largely delayed. That is, when the vehicle enters a steep ascent from a flat road, the change from the D pattern to an $S_1$ or $S_2$ pattern is largely delayed, so that the running at the high speed shift is forced during this delay period thereby to prevent smooth acceleration, while if the vehicle enters from a steep ascent to a flat road, the change from the $S_1$ or $S_2$ pattern to the D pattern is delayed by a large margin, the running at the low speed shift is forced during this delay period, thereby to prevent effective utilization of the engine output, so that it is impossible to avoid aggravation of fuel consumption. If the certain time is shortened, the change of the shift pattern becomes unnecessarily frequent as described above, comfortable riding becomes worse, and an attempt for solving this problem cannot be attained.

SUMMARY OF THE INVENTION

It is an object of the present invention to eliminate the above described disadvantage of the conventional speed change control device.

It is another object of the present invention to provide a shift control device for an automatic transmission by embodying such an idea that in order to judge the road surface gradient during running by comparing the reference acceleration with the actually measured acceleration as described above, and to make the decision for selecting and changing to the best shift pattern for the road surface gradient, both the above accelerations are not compared as they are unnecessary. The corrected reference acceleration, obtained by operating upon the reference acceleration with a predetermined value, is compared with the actually measured acceleration, or the corrected actually measured acceleration, obtained by operating upon the actually measured acceleration with a predetermined value, is compared with the reference acceleration, so that a hysteresis can be set for changing the shift pattern. Any unnecessary shift pattern can positively be avoided without disadvantage of delaying the changing of the shift pattern described above.

According to the present invention a shift control device for an automatic transmission comprises a vehicle speed sensor for sensing vehicle speed, an engine load sensor for sensing engine load, a shift control circuit for generating speed change instruction signal based on a predetermined shift pattern in accordance with output signals from both sensors, a shift pattern decision circuit including means for generating a resulting signal obtained by arithmetically operating upon the actually measured acceleration from the output voltage of the vehicle speed sensor, a reference acceleration setting means connected to both sensors for obtaining, for every shift position, a reference acceleration corresponding to the output signals delivered from the vehicle speed sensor and engine load sensor, a comparator means for comparing the actually measured acceleration with the reference acceleration to change a predetermined shift pattern based on the compared result, and means for setting a hysteresis characteristic to the change of shift pattern. The hysteresis setting means supplies to the comparator means a signal corresponding to a corrected actually measured acceleration formed by decreasing the actually measured acceleration by a predetermined value. The hysteresis setting means also supplies to the comparator means a signal corresponding to a corrected reference acceleration formed by increasing the reference acceleration by a predetermined value.

The hysteresis characteristic set by the hysteresis setting means has a different amount in accordance with the value of engine load. The hysteresis characteristic set by the hysteresis setting means has a different amount in accordance with the conditions when the shift pattern is changed from low speed side to high speed side and from high speed side to low speed side, respectively.

DESCRIPTION OF THE PREFERRED EMBODIMENT

Referring now to the drawing one embodiment of a shift control device according to the present invention constituted by an analog circuit will be explained.

Figure 3:
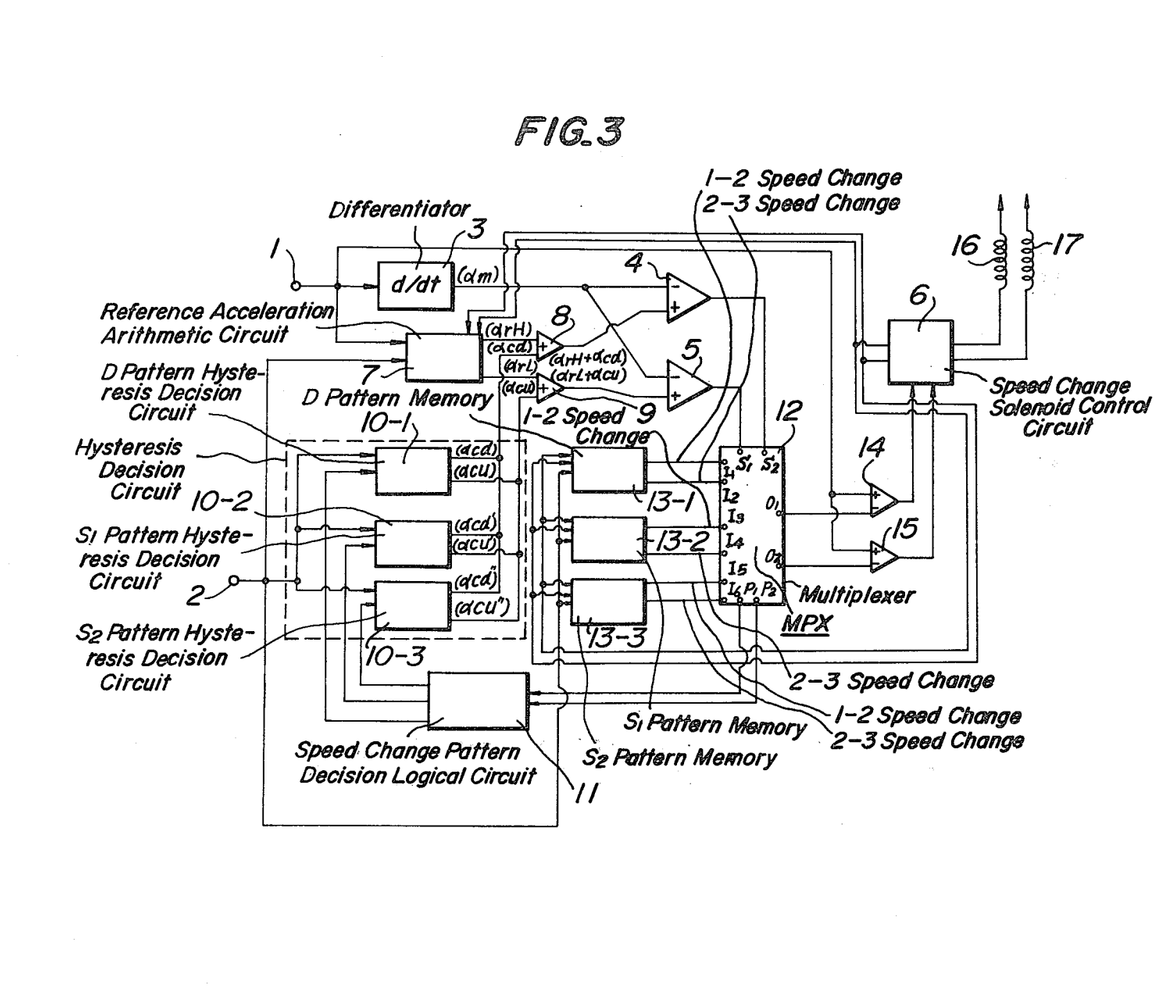
FIG. 3 is a block diagram showing one embodiment of the shift control device according to the present invention which is constructed by analog circuit.

In FIG. 3, reference numeral 1 is a vehicle speed sensor and reference numeral 2 is a throttle sensor. The vehicle speed sensor 1 generates voltage signals in proportion to the vehicle speed and the throttle sensor 2 generates voltage signals corresponding to the load condition of engine, for example, proportional to the throttle opening degree. The vehicle speed signals from the sensor 1 are supplied to a differentiator 3 which differentiates the vehicle speed signals and generates an actually measured acceleration signal $\alpha_m$ corresponding to the actual acceleration of the vehicle. The actually measured acceleration signal $\alpha_m$ from the differentiator 3 is supplied to the inverted input terminals of comparators 4 and 5, respectively.

The vehicle speed signal from the sensor 1 and the signal representing throttle opening degree from the sensor 2 are supplied to a reference acceleration arithmetic circuit 7, which also receives a signal representing a present shift position derived from a shift solenoid control circuit 6 which will be explained later on. The arithmetic circuit 7 operates these three kinds of signals and generates voltage signals corresponding to the reference accelerations required to climb a sloping road having grade of road surface of 5% and 10% in driving conditions, for example, the reference accelerations shown in FIG. 4 by $\alpha_{rH}$ (grade of road surface of 5%) and $\alpha_{rL}$ (grade of road surface of 10%). These signals are supplied to adders 8 and 9, respectively. The throttle opening signal from the sensor 2 is also supplied to a hysteresis decision means 10 for selectively using a plurality of shift patterns. The hysteresis decision means comprises three hysteresis decision circuits 10-1, 10-2 and 10-3 which correspond to the number of selectively used shift patterns. The circuit 10-1 serves to select a D pattern (normal running), the circuit 10-2 serves to select a $S_1$ pattern (grade of road surface of 5%) and the circuit 10-3 serves to select a $S_2$ pattern (grade of road surface of 10%).

The hysteresis decision circuits 10-1, 10-2 and 10-3 are connected to a shift pattern decision logic circuit 11 which generates a signal to operate any one of these circuits 10-1, 10-2 and 10-3. The shift pattern decision logic circuit 11 generates a signal corresponding to the shift pattern selected at present by receiving the outputs from the terminals $P_1$ and $P_2$ of a multiplexer 12 for selecting the shift patterns D, $S_1$ and $S_2$ which will be described later on, and selects and operates only the hysteresis decision circuit 10-1, 10-2 or 10-3 corresponding to the selected shift pattern D, $S_1$ or $S_2$.

Each hysteresis decision circuit 10-1 (10-2, 10-3) serves to supply to the adder 8 a hysteresis voltage signal $\alpha_{cd}$ ($\alpha'_{cd}$, $\alpha''_{cd}$) for providing the hysteresis characteristic to the shift pattern when the pattern is changed over as $D \to S_1 \to S_2$ and supply to the adder 9 a hysteresis voltage signal $\alpha_{cu}$ ($\alpha'_{cu}$, $\alpha''_{cu}$) for providing hysteresis characteristic to the shift pattern when the pattern is changed over as $D \leftarrow S_1 \leftarrow S_2$. Each hysteresis decision circuit 10-1, 10-2, 10-3 operates upon the hysteresis voltage so as to vary the absolute value thereof in proportion to the received throttle opening signal.

Figure 4:
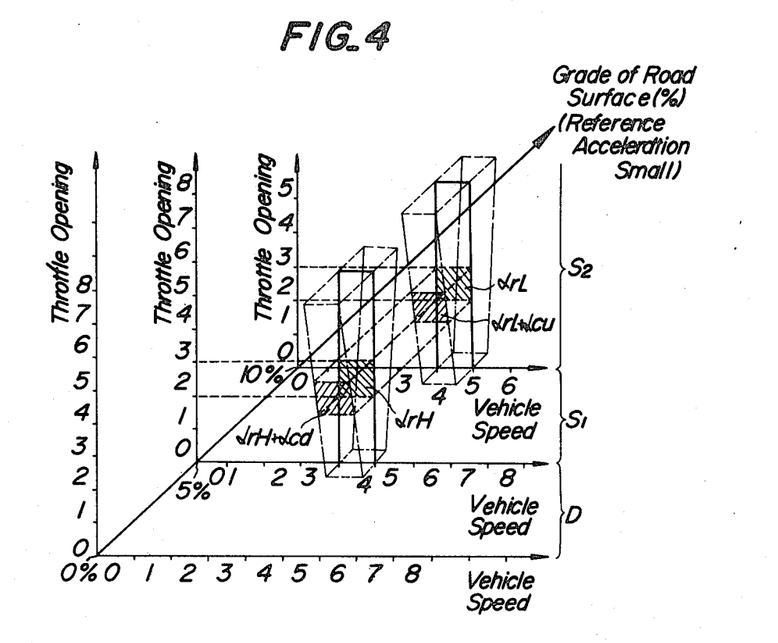
FIG. 4 is a diagrammatic view showing a reference acceleration and a corrected reference acceleration which are used in the device according to the present invention and shown by three-dimensional coordinate of vehicle speed, throttle opening degree and grade of road surface.

The adders 8 and 9 add or subtract the above hysteresis voltages, for example, the hysteresis voltages $\alpha_{cd}$ and $\alpha_{cu}$ from the D pattern hysteresis decision circuit 10-1 to or from the reference acceleration signals $\alpha_{rH}$ and $\alpha_{rL}$, respectively, thereby to supply corrected reference acceleration signals $\alpha_{rH} + \alpha_{cd}$ and $\alpha_{rL} + \alpha_{cu}$ to the non-inverted input of the comparators 4 and 5. Therefore, the corrected reference acceleration signals are signals which are shifted in the grade direction of the road surface the original reference acceleration signals $\alpha_{rH}$ and $\alpha_{rL}$ by the magnitude of the hysteresis voltage signal $cd$ or $cu$ as shown in FIG. 4. This shifted degree is different in accordance with the throttle opening as shown in FIG. 4 by an alternate long and short dash line, since the absolute value of the hysteresis voltage is made large in proportion to the above throttle opening. The direction of the above shift can be reversed as shown in FIG. 4 by an alternate long and two short dash line by making the polarity of the hysteresis voltages $\alpha_{cd}$ and $\alpha_{cu}$ in opposite direction. The shift degree and the shift direction therefore can be selected freely by every shift pattern in accordance with the required hysteresis.

In the illustrated embodiment, adders 8, 9 are used for obtaining the corrected reference acceleration signal, however, a subtractor or a multiplier (divider) can also used instead of an adder. For example, in the case of multiplier, provided that, for example, the corrected reference acceleration $\alpha'_r$ is obtained by operation of $\alpha'_r = K\alpha_4$ it is obvious that the hysteresis decision circuit 10-1, 10-2, 10-3 must be replaced by the circuit for generating the K (constant or variable).

The corrected reference acceleration signals $\alpha_{rH} + \alpha_{cd}$ and $\alpha_{rL} + \alpha_{cu}$ are compared with the actually measured acceleration signal $\alpha_m$ in the comparators 4 and 5, respectively, and the compared results are supplied to terminals $S_2$ and $S_1$ of the multiplexer 12 from the comparators 4 and 5. The comparator 4 generates to the $S_2$ terminal a signal of high (H) level when $\alpha_m < \alpha_{rH} + \alpha_{cd}$ and to the $S_2$ terminal a signal of low (L) level, when $\alpha_m > \alpha_{rH} + \alpha_{cd}$ respectively. The comparator 5 generates to the $S_1$ terminal a signal of high (H) level when $\alpha_m < \alpha_{RL} + \alpha_{cu}$, and to the $S_1$ terminal a signal of low (L) level when $\alpha_m > \alpha_{rL} + \alpha_{cu}$.

The multiplexer 12 has input terminals $I_1$ to $I_6$ which receive signals from shift pattern memory circuits 13-1, 13-2 and 13-3. These shift pattern memory circuits 13-1, 13-2 and 13-3 store D pattern, $S_1$ pattern and $S_2$ pattern shown in FIG. 2, respectively. The D pattern memory circuit 13-1, $S_1$ pattern memory circuit 13-2 and $S_2$ pattern memory circuit 13-3 receive the throttle opening signal from the throttle sensor 2 and the shift position signal from the shift solenoid control circuit 6 respectively. Each shift pattern memory circuit discriminates the shift position signal by a logic circuit provided therein, selects an up-shift line (solid line) or down-shift line (dotted line) in three shift patterns shown in FIG. 2, operates from stored shift pattern speed change signals corresponding to the throttle opening signals, and supplies these shift signals to the multiplexer 12. The shift signals from each shift pattern memory circuit are supplied to terminals $I_1$, $I_3$ and $I_5$ of the multiplexer 12 in the case of 1-2 shift and to terminals $I_2$, $I_4$ and $I_6$ of the multiplexer 12 in the case of 2-3 shift.

The multiplexer 12 selects shift patterns as shown in the following table by the combination of signal levels H and L supplied to terminals $S_1$ and $S_2$ of the multiplexer.

| Signal | $S_1$ | H | L | L |
|---|---|---|---|---|
| level | $S_2$ | H | H | L |
| Speed change pattern | | $S_2$ | $S_1$ | D |

The multiplexer 12 selects the shift signal from the shift pattern memory circuit 13-1, 13-2 or 13-3 corresponding to the shift pattern thus selected and supplies the 1-2 shift signal to the inverted input of a comparator 14 from $O_1$ terminal and the 2-3 shift signal to the inverted input of a comparator 15 from $O_2$ terminal. The non-inverted inputs of the comparators 14 and 15 receive vehicle speed signals corresponding to present vehicle speed obtained from the vehicle speed sensor 1, respectively, so that the comparator 14 compares the vehicle speed signal with the 1-2 shift signal and the comparator 15 compares the vehicle speed signal with the 2-3 shift signal.

The output signals from comparators 14 and 15 are signals representing that any speed in speeds of first, second and third speed should be selected as the present speed so that with reception of these signals the shift solenoid control circuit 6 energizes both the 1-2 shift solenoid 16 and the 2-3 shift solenoid when the shift corresponds to first speed, only the 1-2 shift solenoid 16 when the shift corresponds to second speed, and deenergizes both the 1-2 shift solenoid 16 and the 2-3 shift solenoid 17 when the shift corresponds to third speed, thereby to change power transmission path of a planet gear of an automatic transmission including a pair of planet gears by selecting and actuating a clutch(s) and-/or brake(s) which are actuated with fluid pressure with the aid of a valve driven by the solenoid.

Figure 5:
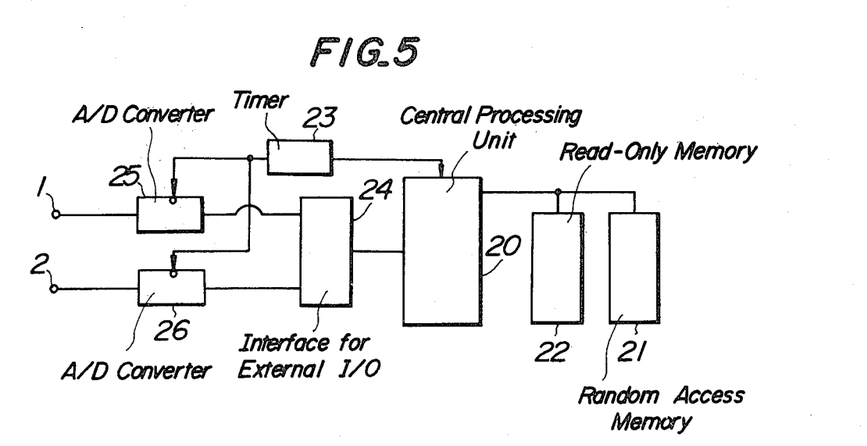
FIG. 5 is a block diagram showing another embodiment of the device according to the present invention which is constructed by a microcomputer.
Figure 6:
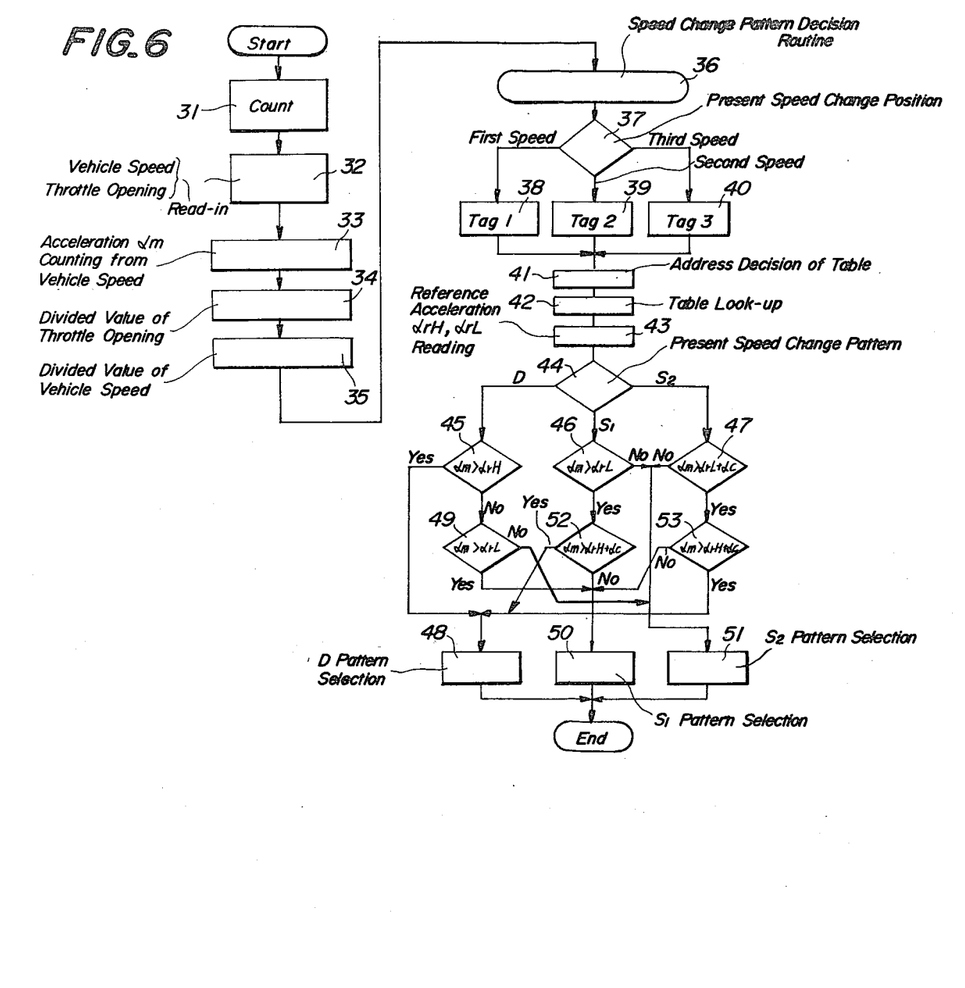
FIG. 6 is a flow chart showing a control program used for the device shown in FIG. 5.

FIG. 5 shows another embodiment of a shift control device according to the invention with the use of a microcomputer. Its control program is as shown in FIG. 6.

In FIG. 5, reference numeral 20 is a central processing unit (CPU), 21 a random access memory (RAM), 22 a read only memory (ROM), 23 a timer, 24 an external input/output interface device (PIA), and 25, 26, analog-digital converters (A/D), respectively. When receiving an interruption signal generated periodically from the timer 23, the CPU 20 counts up one-by-one the contents of the counter in the RAM 21 at a block 31 shown in FIG. 6, and, at the same time, at a block 32, vehicle speed data and throttle opening data converted into digital amounts, respectively, by the A/D converters 25, 26 from the vehicle speed sensor 1 and the throttle sensor 2, are read in the RAM 21 through the PIA 24 by every certain time.

The CPU 20 reads out the vehicle speed data from the RAM 21 at a block 33, subtracts a difference between the read vehicle speed data and the vehicle speed data already read in by the interruption signal in a period of a certain time between the interruption signals, obtains the actually measured acceleration $\alpha_m$ there-from and reads the data in the RAM 21. The CPU 20 further reads out the throttle opening data and vehicle speed data from the RAM 21 at blocks 34, 35, respectively, judges which one of the divided value of the throttle opening or the divided value of the vehicle speed these data belong to in accordance with a predetermined program, and reads these divided values in the RAM 21.

The control proceeds to a block 36, where a shift pattern decision routine is executed, and by this transmission pattern decision routine a shift pattern is determined as follows. In the first place, at a block 37, a signal representing the shift position at present is detected, and at a block 38 in case of the first speed, at a block 39 in case of the second speed, and at a block 40 in case of the third speed, there is determined the top address ($Ta_{g1}$, $Ta_{g2}$, $Ta_{g3}$) of a table for the reference (estimated) acceleration stored in the ROM 22 by shift position, respectively.

Figure 7A:
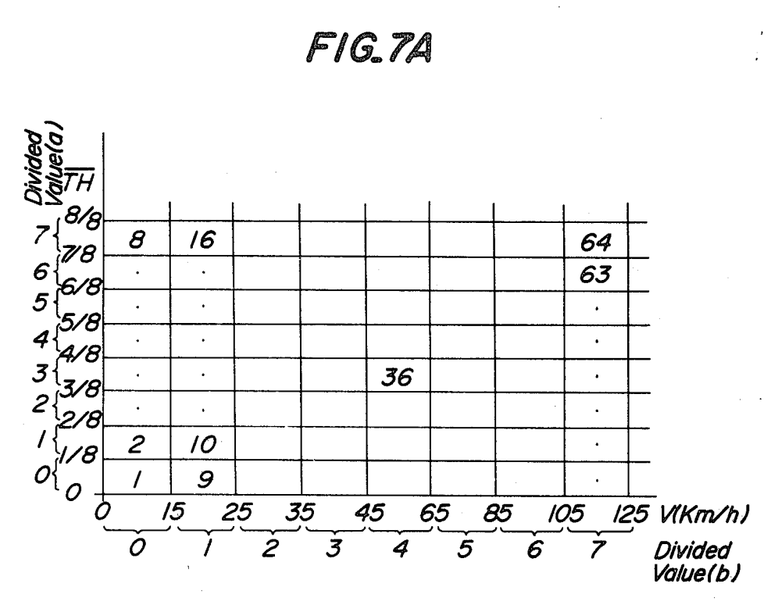
FIG. 7a and 7b are explanatory views showing a table look-up of the reference acceleration.
Figure 7B:
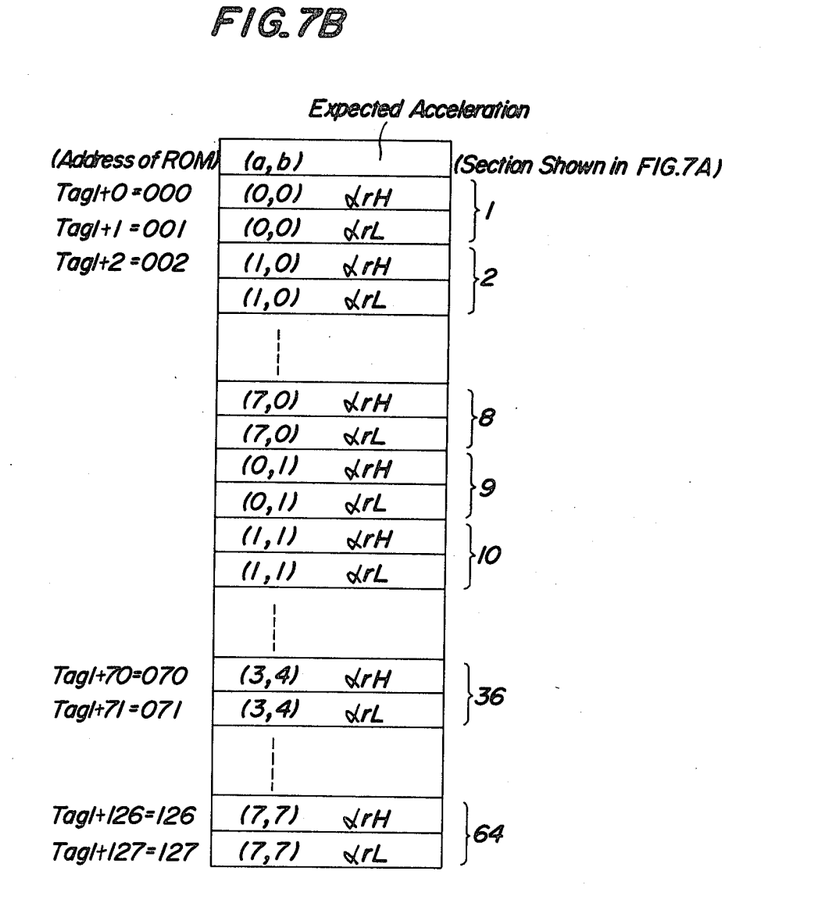

The reference acceleration in case of the first speed is shown in FIG. 7, and is preliminarily stored in the ROM 22. That is, as shown in FIG. 7A, the throttle opening and the vehicle speed are divided into eight, respectively, and for each throttle divided value and vehicle speed divided value, the reference acceleration $\alpha_{rH}$ obtained when running a slope having 5% gradient and the reference acceleration $\alpha_{rL}$ obtained when running a slope of 10% gradient are stored in the special address of the ROM 22 as shown in FIG. 7B, and the similar reference accelerations with respect to the other shift positions are stored in the ROM 22. The top address of the first speed reference table is determined at the block 38, so that the reference accelerations $\alpha_{rH}$, $\alpha_{rL}$ corresponding to a set of each divided value a (throttle opening) and b (vehicle speed) at the shift position (first speed) can be read out as an address having addresses $\phi_1$, $\phi'_1$ expressed by the following equation from FIG. 7A.

$$\alpha_{rH} \cdots \phi_1 = 2_a + 16_b + Ta_{g1}$$

$$\alpha_{rL} \cdots \phi'_1 = 2_a + 16_b + Ta_{g1} + 1$$

That is, in FIG. 7A, if a set of the throttle opening divided value and the vehicle speed divided value is (0, 0), the section corresponds to 1, and the addresses $\phi_1$, $\phi'_1$ of the reference accelerations $\alpha_{rH}$, $\alpha_{rL}$ in this section 1 become $Ta_{g1} = 000$ and $Ta_{g1} + 1 = 001$, respectively, from the above as shown in FIG. 7B, and if the section in FIG. 7A is 36, the addresses $\phi_1$, $\phi'_1$ of the reference accelerations $\alpha_{rH}$, $\alpha_{rL}$ in this section become $Ta_{g1} + 70 = 070$ and $Ta_{g1} + 71 = 071$, respectively.

In the same manner, the reference accelerations $\alpha_{rH}$, $\alpha_{rL}$ at the time of the 5% gradient and 10% gradient corresponding to the throttle opening divided value and the vehicle speed divided value at the second speed are stored in the addresses of $$\alpha_{rH} \cdots \phi_2 = 2_a + 16_b + Ta_{g2}$$

$$\alpha_{rL} \cdots \phi'_2 = 2_a + 16_b + Ta_{g2} + 1$$

in the ROM 22, respectively, as $Ta_{g3} = 200$, and in case of the third speed, the reference accelerations $\alpha_{rH}$, $\alpha_{rL}$ at the time of the 5% gradient and 10% gradient are stored in the addresses of $$\alpha_{rH} \cdots \phi_3 = 2_a + 16_b + Ta_{g3}$$

$$\alpha_{rL} \cdots \phi'_3 = 2_a + 16_b + Ta_{g3} + 1$$

in the ROM 22, respectively, as $Ta_{g3} = 400$.

The control proceeds to a block 41, wherein the address in the ROM 22 is determined by the above equations from the top addresses $Ta_{g1}$, $Ta_{g2}$ or $Ta_{g3}$ determined at the blocks 38–40 and the throttle divided value and the vehicle speed divided value obtained at the blocks 34 and 35 by every certain time, based on this address, at a block 42, reference accelerations $\alpha_{rH}$, $\alpha_{rL}$ corresponding to the shift position at present, throttle opening and the vehicle speed are table look-up, and the reference accelerations $\alpha_{rH}$, $\alpha_{rL}$ are read out from the ROM 22 at a next control block 43.

Figure 8:
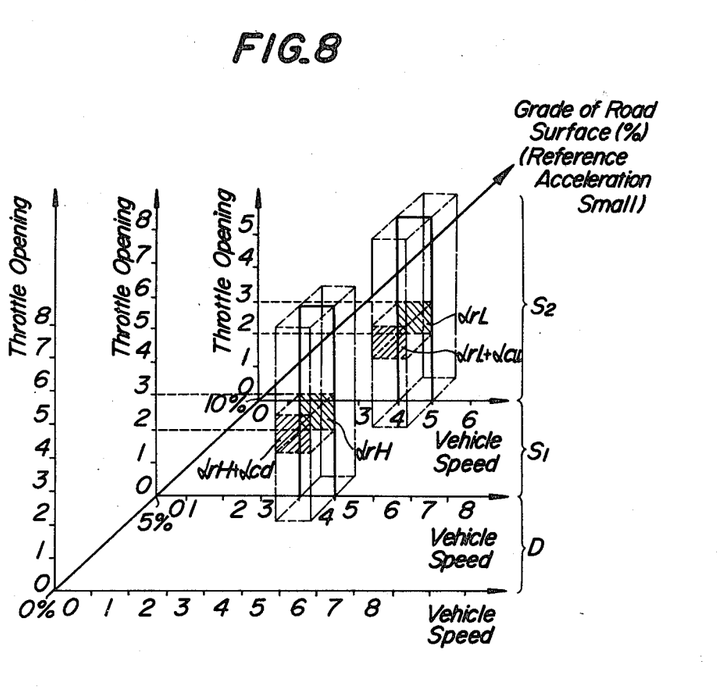
FIG. 8 is a diagrammatic view showing a reference acceleration and a corrected reference acceleration which are used in the device shown in FIG. 5 and shown by three-dimensional coordinate as in FIG. 3.

The thus read-out reference accelerations $\alpha_{rH}$, $\alpha_{rL}$ are as shown by oblique lines in FIG. 8 by taking the case that the throttle divided value is 2 and the vehicle speed divided value is 4 as an example.

The control proceeds to a block 44, where the shift pattern is selected at present is judged. Now, if the device according to the present invention can selectively use the D pattern, $S_1$ pattern and $S_2$ pattern shown in FIG. 2, when the D pattern is selected, the control block 45 is selected, when the $S_1$ pattern is selected, the control block 46 is selected, and the $S_2$ pattern is selected, the control block 47 is selected, respectively.

In the block 45, the actually measured acceleration $\alpha_m$ obtained at the block 33 is compared with the reference acceleration $\alpha_{rH}$ read out at the block 43, and if the actually measured acceleration is larger than the reference acceleration, that is, in case that the predetermined acceleration is carried out even with the shift pattern at present, the control proceeds to the D pattern selection block 48 and the shift pattern is maintained as the D pattern, while if the actually measured acceleration $\alpha_m$ is smaller than the reference acceleration $\alpha_{rH}$, the control proceeds to a block 49. In the block 49, the actually measured acceleration $\alpha_m$ is compared with the reference acceleration $\alpha_{rL}$ read out at the block 43, and if the actually measured acceleration is larger than the reference acceleration, the control proceeds to an $S_1$ pattern selection block 50, the shift pattern is changed from the D pattern to the $S_1$ pattern, and if the actually measured acceleration $\alpha_m$ is smaller than the reference acceleration $\alpha_{rL}$, the control proceeds to the $S_2$ pattern selection block and the shift pattern is changed from the D pattern to the $S_2$ pattern.

When the control block 46 is selected during the selection of the $S_1$ pattern, the actually measured acceleration $\alpha_m$ is compared with the reference acceleration $\alpha_{rL}$ in this block, and if the $\alpha_m$ is smaller than $\alpha_{rL}$, the control proceeds to an $S_2$ pattern selection block 51 and the shift pattern is changed from the $S_1$ pattern to the $S_2$ pattern. When judging $\alpha_m > \alpha_{rL}$ in the block 46, a control block 52 is selected. In this block the CPU 20 reads out from the ROM 22 a certain acceleration $\alpha_c$ corresponding to the required hysteresis stored in the ROM 22 and makes operation of $\alpha_{rH} + \alpha_c$, and this operated result, that is, the corrected reference acceleration is compared with the actually measured acceleration $\alpha_m$. This corrected reference acceleration $\alpha_{rH} + \alpha_c$, as shown by oblique lines in FIG. 8, has hysteresis by $\alpha_c$ downward in the direction of road surface gradient (gentle road surface gradient) from the reference acceleration $\alpha_{rH}$. In the block 52, in case of judging as $\alpha_m > \alpha_{rH} + \alpha_c$, the control proceeds toward the D pattern selection block 48, and the shift pattern is changed from the $S_1$ pattern to the D pattern, while if the actually measured acceleration $\alpha_m$ is smaller than the corrected reference acceleration $\alpha_{rH}+\alpha_c$, the control proceeds toward the $S_1$ pattern selection block 50 and the shift pattern is maintained in the $S_1$ pattern.

When the control block 47 is selected during the selection of the $S_2$ pattern, in this block, the reference acceleration $\alpha_{rL}$ is added to a certain acceleration $\alpha_c$ corresponding to the hysteresis in the same manner as described above, and the corrected reference acceleration $\alpha_{rL}+\alpha_c$ obtained from this operated result is compared with the actually measured acceleration $\alpha_m$. This corrected reference acceleration $\alpha_{rL}+\alpha_c$ has hysteresis by $\alpha_c$ downward in the direction of road surface gradient (gentle road surface gradient) from the reference acceleration $\alpha_{rL}$ as shown by oblique lines in FIG. 8. In the block 47, when judging $\alpha_m > \alpha_{rL}+\alpha_c$, the control proceeds to the $S_2$ pattern selection block 51 and the shift pattern is maintained as the $S_2$ pattern, and when judging $\alpha_m > \alpha_{rL}+\alpha_c$, the control block 53 is selected. In the block 53, the hysteresis acceleration $\alpha_c$ is added to the reference acceleration $\alpha_{rH}$ in the same manner as in the above, and from the operated result, the corrected reference acceleration $\alpha_{rH}+\alpha_c$ is compared with the actually measured acceleration $\alpha_m$. When judging $\alpha_m < \alpha_{rH}+\alpha_c$ herein, the control proceeds to the $S_1$ pattern selection block 50, and the shift pattern is changed from the $S_2$ pattern to the $S_1$ pattern, and when judging $\alpha_m > \alpha_{rH}+\alpha_c$, the control proceeds to the D pattern selection block 48 and the shift pattern is changed from the $S_2$ pattern to the D pattern.

As apparent from the above explanation, between the D pattern and $S_1$ pattern and between the $S_1$ pattern and $S_2$ pattern, there is given the hysteresis by $\alpha_c$ between shift patterns adjacent to each other bordered by the reference accelerations $\alpha_{rH}$ and $\alpha_{rL}$ at the blocks 45 and 52 and at the blocks 46 and 47, respectively.

The shift control device according to the present invention can selectively use several kinds of shift patterns based on the compared result of the actually measured acceleration with the reference acceleration by the construction of the above embodiments, and in case of changing the shift pattern from a low speed pattern to a high speed pattern, that is, $S_2 \rightarrow S_1 \rightarrow D$ direction, the corrected reference acceleration formed by adding the hysteresis acceleration to the reference acceleration is aimed at the comparison target of the actually measured acceleration, so that it becomes possible to give the hysteresis by the added acceleration for changing to the high speed pattern. Therefore without any disadvantages of delaying the changing of the shift pattern as in the prior art, the changing of an unnecessary transmission pattern is positively prevented, so that a comfortable ride feeling can be improved.

Particularly, in the embodiment shown in FIG. 3, a hysteresis amount can be set by every shift pattern to be selected at present, and even if the required hysteresis amount is different between the shift patterns to be changed, it can easily be handled, and the shift pattern changing characteristic as required can provide to any vehicles.

In the embodiments, the hysteresis is set by correcting and operating the reference acceleration by a certain acceleration value, but it is also possible to set the dissimilar hysteresis by forming a corrected actually measured acceleration by correcting and operating a certain acceleration value from the actually measured acceleration and comparing it with the reference acceleration so as to judge the changing of the speed change pattern.

What is claimed is:

1. In a shift control device for an automatic transmission having a vehicle speed sensor (1) for sensing vehicle speed to generate vehicle speed signals, an engine load sensor (2) for sensing engine load to generate signals representing the engine load, a shift control circuit (6) connected to said sensors (1, 2) for generating shift position and instruction signals based on any one of at least two predetermined shift patterns (D, $S_1$, $S_2$) of a transmission range suitable for different driving conditions of a vehicle in accordance with output signals supplied from both sensors, the shift instruction signals being supplied to shift solenoids (16, 17), the improvement comprising:
a shift pattern decision circuit connected between the sensors (1, 2) and the shift control circuit (6) for generating signals capable of selecting and deciding any one of the shift patterns of the transmission range, said shift pattern decision circuit including a hysteresis setting means for setting hysteresis to the changeover characteristic between the shift patterns (D, $S_1$, $S_2$), the hysteresis characteristic set by said hysteresis setting means varying in accordance with whether the shift pattern is changed over from low speed to high speed side or from high speed side o low speed side, respectively.

2. A shift control device for an automatic transmission as claimed in claim 1, wherein the shift pattern decision circuit comprises a differentiator (3) connected to the speed sensor (1) for generating actually measured acceleration signals, reference acceleration setting means (7) connected to receive output signals of each sensor (1, 2) and the shift control circuit (6) for obtaining, for every shift position, reference acceleration signals corresponding to said output signals, first comparator means (4, 5) connected to the differentiator (3) and the reference acceleration setting means (7) for comparing the actually measured acceleration signals with the reference acceleration signal, shift pattern memory circuits (13-1, -2, -3) connected to the engine load sensor (2) and the shift control circuit (6) for comparing previously stored shift patterns therein with the shift position signal and the signal representing the engine load to generate shift signals, a multiplexer (12) connected to receive ouptut signals of the first comparator means (4, 5) and the memory circuits (13) for generating shift signals, second comparator means (14, 15) connected to receive vehicle speed signals of the speed sensor (1) and shift signals of the multiplexer (12) for generating to the shift control circuit (6) signals selecting a suitable transmission speed ratio for each shift pattern.

3. A shift control device for an automatic transmission as claimed in claim 2, wherein the hysteresis setting means comprises a shift pattern decision logical circuit (11) connected to the multiplexer (12) for generating signals representing the present selected shift pattern, hysteresis decision circuits (10-1, -2, -3) connected to receive the signals representing the engine load from the engine load sensor (2) and to selectively operate by the output signals of the logical circuit (11) for generating signals corresponding to hysteresis amount necessary to make a difference to acceleration being basis of the change-over between the shift patterns in both directions, and adder means (8, 9) connected to receive acceleration signals and output signals of the hysteresis decision circuits (10-1, -2, -3) for generating to the first comparator means (4, 5) corrected acceleration signals capable of making transfer of acceleration signals in the grade of road surface direction.

4. A shift control device for an automatic transmission as claimed in claim 3, wherein the adder means (8, 9) are connected between the reference acceleration setting means (7) and the first comparator means (4, 5) for generating corrected reference acceleration signals.

5. A shift control device for an automatic transmission as claimed in claim 3 wherein the adder means (8, 9) are connected between the differentiator means (3) and the first comparator means (4, 5) for generating corrected actually measured acceleration signals.

6. A shift control device for an automatic transmission as claimed in claim 3 wherein output signals of the hysteresis decision circuits (10-1, -2, -3) have magnitude of absolute value varied in proportion to magnitude of the throttle opening.

7. A shift control for an automatic transmission as claimed in claim 1, wherein the hysteresis characteristic set by the hysteresis setting means varies in accordance with the value of engine load.

8. A shift control device for an automatic transmission as claimed in claim 1, wherein the hysteresis characteristic set by the hysteresis setting means varies in accordance with the value of engine load.

* * * * *